No. 639,715. Patented Dec. 26, 1899.
C. E. CROSBY.
BOLT AND NUT LOCK.
(Application filed May 2, 1899.)
(No Model.)
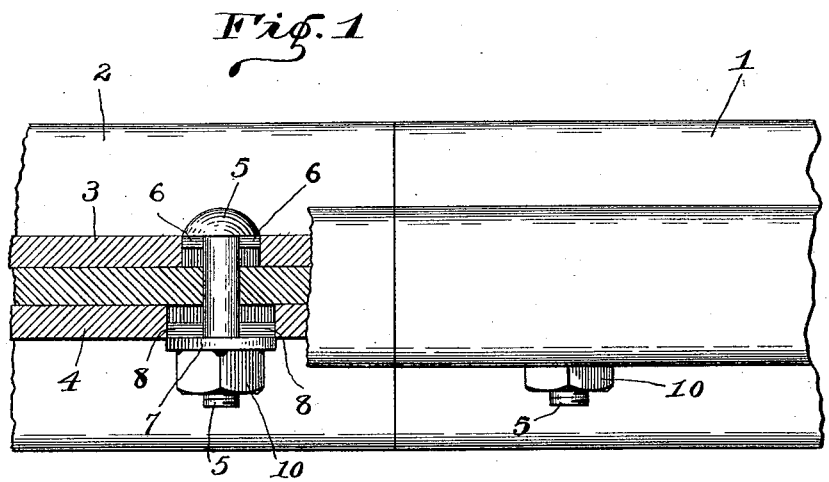
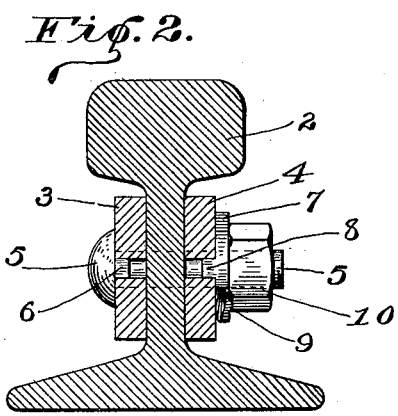
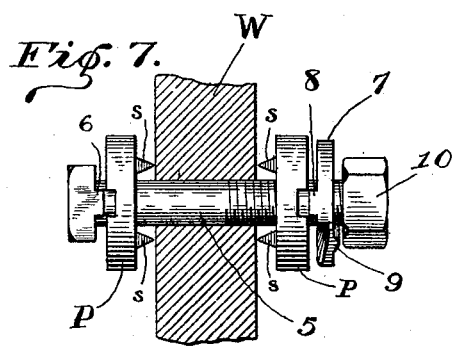
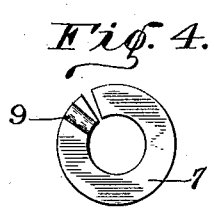
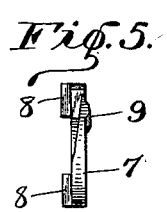
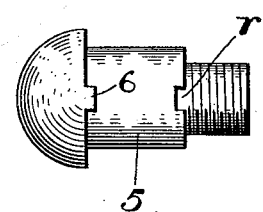
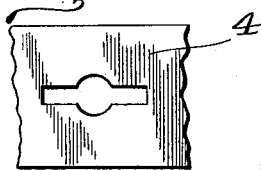
WITNESSES:
C. S. Frye
J. A. Walsh
INVENTOR
Charles E. Crosby,
BY
Chester Bradford,
ATTORNEY.
THE NORRIS PETERS CO., PHOTO-LITHO., WASHINGTON, D. C.

UNITED STATES PATENT OFFICE.

CHARLES E. CROSBY, OF INDIANAPOLIS, INDIANA, ASSIGNOR OF TWO-THIRDS TO JESSE B. HARVEY AND HENRY C. JORDAN, OF SAME PLACE.

BOLT AND NUT LOCK.

SPECIFICATION forming part of Letters Patent No. 639,715, dated December 26, 1899.

Application filed May 2, 1899. Serial No. 715,280. (No model.)

*To all whom it may concern:*

Be it known that I, CHARLES E. CROSBY, a citizen of the United States, residing at Indianapolis, in the county of Marion and State of Indiana, have invented certain new and useful Improvements in Bolt and Nut Locks, of which the following is a specification.

The object of my present invention is to produce an efficient lock for bolts and nuts in whatever situation the same may be used.

Said invention will be first fully described, and the novel features thereof then pointed out in the claim.

Referring to the accompanying drawings, which are made a part hereof and on which similar reference characters indicate similar parts, Figure 1 is a view, partly in top plan and partly in horizontal section, of the two rail ends united by fish-plates and bolts of the structure embodying my present invention; Fig. 2, a transverse sectional view of the same alongside the nut and bolt, illustrating the locking attachments; Fig. 3, a face view of a fragment of a fish-plate; Fig. 4, a front view of the washer forming a part of my invention; Fig. 5, an edge view of the same; Fig. 6, a rear view of the nut; Fig. 7, a view showing the invention as applied to a wooden or other soft structure instead of metal; and Fig. 8, a view of the bolt separately, on an enlarged scale, showing a slightly-different form.

The rail ends 1 and 2 are of the usual or any desired form. The fish-plates 3 and 4 are substantially of the ordinary form, except that short cuts extend out each way from the hole through which the bolts pass, the recesses thus formed being for the reception of lugs, as will be presently described. The bolts 5 may be of the ordinary form, except that they should have lugs 6 on the under side of the head. The washers 7 have corresponding lugs 8 upon one side and a rounded projection 9 upon the other, the latter being close to a split in the washer and at a point where it has been tapered away, as shown, enabling it to act as a spring.

The nut 10 is of the ordinary form, except that it has radial grooves in its under side, as shown most plainly in Fig. 6, which grooves are adapted to engage with the rounded projection 9 on the washer.

Referring especially to Figs. 1 to 6, inclusive, the operation is as follows: The rails and fish-plates are assembled as usual. The bolts 5 are inserted through the holes, with the lugs 6 entering the prolongations in the holes of the fish-plates and being thereby prevented from turning. The washers are then applied on the other side, their lugs 8 entering the prolongations in the holes of the fish-plates, so that said washers are prevented from turning. The nuts 10 are then put on and turned down closely. When each nut reaches its seat, the rounded projection 9 on the washer will be resting in one of the grooves in the face of the nut, which will lock it sufficiently firmly in place to prevent it from working loose, while the nut and the washer 7 are also prevented from revolving by the means shown. The result is an efficient locking of the parts together.

In Fig. 7 I have shown a piece of wood W in place of the rails and locking-plates P in place of the fish-plates, the other parts being the same. The plates P are provided in this construction with spurs s, which sink into the wood, so that any movement between said plates and said wood is prevented.

Fig. 8 illustrates a form of bolt in which one plate P may be dispensed with, if desired, the lugs 8 on the washer 7 entering directly into a recess r just above the threads on the bolt, the bolt being of the shouldered variety.

Having thus fully described my said invention, what I claim as new, and desire to secure by Letters Patent, is—

The combination of a bolt having lugs on the under side of its head, a plate through which the bolt passes having recesses to receive said lugs, a second plate on the opposite side of the structure through which the bolt passes having corresponding recesses, a split washer having lugs adapted to enter said recesses, that portion of said washer on one side of the split being tapered from the under side outwardly, thus forming a spring-tongue without raising the general level of the outer side of the washer, and having a projection on the outer side at or near the point of said spring-tongue, and a nut adapted to be forced onto said bolt and having radial grooves in its under side adapted to engage with said projection on the spring-tongue of said washer, said several parts being constructed, arranged and operating substantially as shown and described.

In witness whereof I have hereunto set my hand and seal, at Indianapolis, Indiana, this 25th day of April, A. D. 1899.

CHARLES E. CROSBY. [L. S.]

Witnesses:
    CHESTER BRADFORD,
    JAMES A. WALSH.